UNITED STATES PATENT OFFICE.

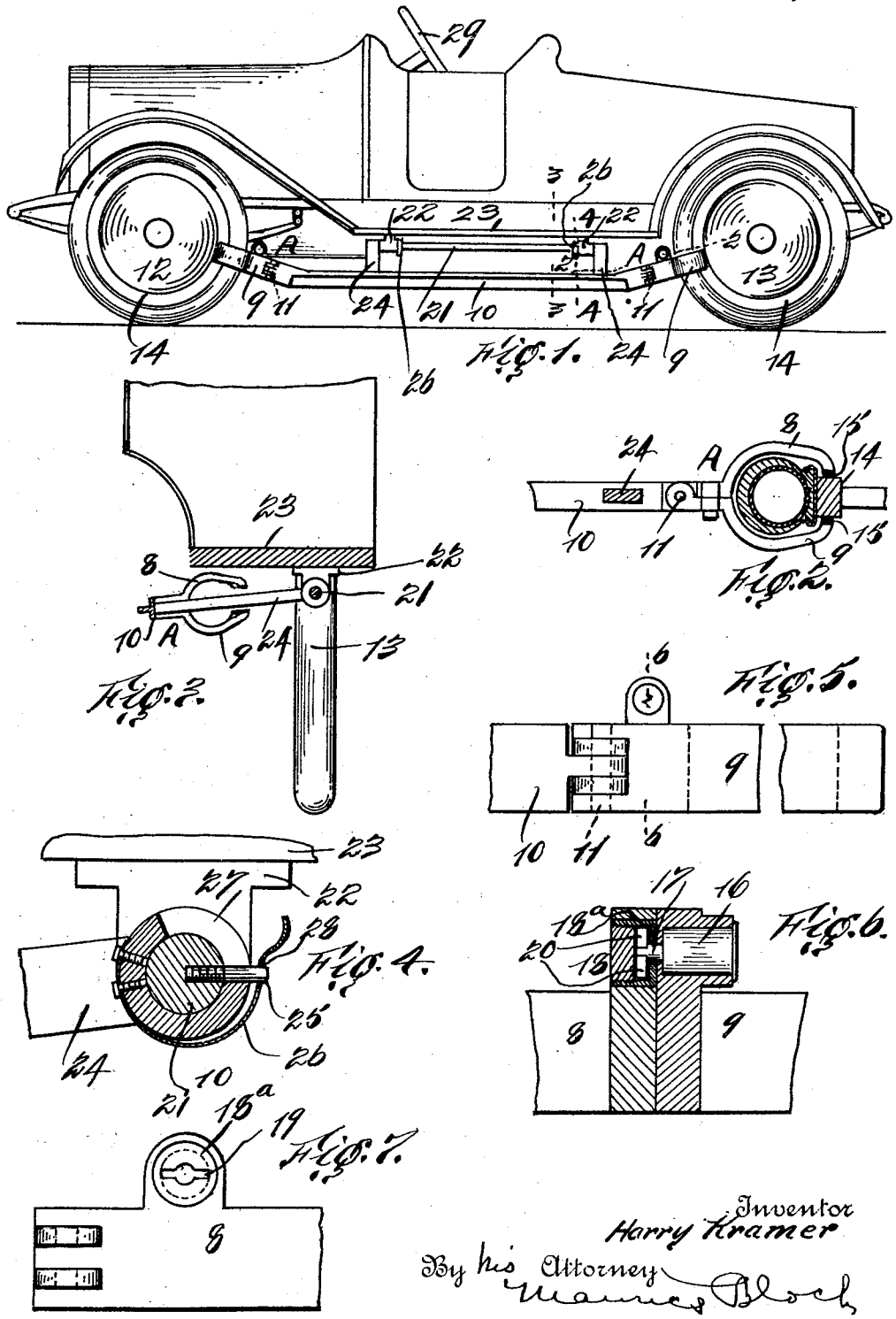

HARRY KRAMER, OF NEW YORK, N. Y.

WHEEL-LOCK FOR AUTOMOBILES.

1,395,430. Specification of Letters Patent. Patented Nov. 1, 1921.

Application filed April 26, 1920. Serial No. 376,436.

*To all whom it may concern:*

Be it known that I, HARRY KRAMER, a citizen of the United States of America, residing at New York city, Bronx county, State of New York, have invented certain new and useful Improvements in Wheel-Locks for Automobiles, of which the following is a full, clear, and exact description.

This invention relates to improvements in locking devices for motor vehicles, the object being to provide means to prevent the steering of the front wheels of the vehicle at will, so as to provide against theft of the vehicle, as more fully hereinafter explained.

It will, of course, be understood that the wheels will be locked against such movement as is necessary to guide the vehicle while the said vehicle is parked to prevent the operation of the vehicle, or purloining of same, by unauthorized persons.

To carry my invention into practice, I provide means to engage the wheels of the vehicle, that is to say, the wheels at the left side, to prevent same from being turned; hence the vehicle cannot be operated for any distance as it could not be diverted out of a straight course.

I will now proceed to describe my invention in detail, the novel features of which will be pointed out in the appended claims, reference being had to the accompanying drawing, wherein:—

Figure 1 is a diagrammatic side view of a motor vehicle equipped with my improvement, the vehicle being illustrated with the lock in operable position;

Fig. 2 is an enlarged fragmentary sectional plan view, the section being taken on a line 2—2 in Fig. 1;

Fig. 3 is an enlarged sectional view, the section being taken on line 3—3 in Fig. 1, the locking device being illustrated as raised and out of use;

Fig. 4 is an enlarged fragmentary sectional view, illustrating the means to maintain the wheel-lock in raised position, the section being taken on a line 4—4 in Fig. 1;

Fig. 5 is an enlarged fragmentary detail side view illustrating the locking means to prevent the opening of the clamp members;

Fig. 6 is a fragmentary sectional view, the section being taken on a line 6—6 in Fig. 5; and Fig. 7 is a fragmentary detail view, illustrating the keeper on one clamp member to coöperate with the lock on the other clamp member.

To prevent the turning of the front wheels of a motor vehicle sidewise, I provide means to engage said front wheels in such manner as to lock them against steering movement. To accomplish this end, I provide clamp members 8 and 9, which are pivotally connected together and to a bar 10, as at 11, there being a pair of these clamps at each end of the bar 10 to engage a front wheel 12 and a rear wheel 13. Each clamp, indicated generally by A, is arranged to straddle the tires of the adjacent wheel and engage the felly 14 of said wheel, and if desirable the ends of the clamp members can be padded as at 15. The clamp jaws or members 8 and 9 will be locked, after having been caused to engage their respective wheels, by a suitable locking device, such as a cylinder 16 having tumblers (not shown) to actuate a bolt 17 by means of a suitable key (not shown). In this instance the lock cylinder 16 is carried by the clamp member 9, the clamp member 8 being provided with a keeper 18 to be engaged by the bolt 17. In this instance keeper 18 consists of a chambered block 18ª having a slot 19, in one face, for the free passage of the lips 20 on the bolt 17 when said lips are disposed in parallelism with slot 19. To lock the clamp members against separation, after they have been caused to engage a wheel, the bolt 17 will be turned, by means of the proper key, to cause lips 20 to assume a vertical position, after which the clamp members cannot be separated until bolt 17 is again turned to horizontal position.

The bar 10, which carries the clamp members will be preferably supported by a rod 21 pivotally supported by brackets 22 secured to the under surface of the running board 23. The bar 10 is provided with hangers 24, the upper end of each hanger being secured to rod 21 by a key or otherwise. To maintain the locking device or locking frame in raised position, indicated in Fig. 3, I provide a latch mechanism consisting of pins 25, Fig. 4, carried by rod 21 and yieldable plates 26 to separably engage said pins. Each pin 25 passes through a slot 27 in its adjacent bracket 22 which is of a length sufficient to permit the locking device or frame to drop to a position for engagement with the wheels. To lower or drop the frame, plate 26 will be pulled outwardly to permit pin 25 to be withdrawn from the opening 28 in said plate. After plate 26 has been moved out of engagement with said pin, the frame can be lowered. To cause the clamp members to engage their respective wheels, said members will be spread apart sufficiently to allow same to clear the tires. After the frame has been lowered to a position in alinement with the tires, the clamp jaws will be closed to straddle the tires and then locked. After the jaws have been locked, the front wheels cannot be moved sidewise or steered.

I preferably arrange the device so that a front and rear wheel is engaged, as this arrangement will prevent twisting of the locking frame should an attempt be made to break the device by operating the steering wheel 29. The locking device herein, indicated, as illustrative only, as it was deemed superfluous to deal in detail with any particular locking device. To release the locking frame, it is but necessary to unlock the clamp members, spread same and swing the frame upwardly until pins 25 snap into the openings 28 in the adjacent yieldable latching plates 26.

Having described my invention, what I claim and desire to secure by Letters Patent is:—

1. In a lock for vehicle wheels, a clamping device pivotally connected to said vehicle adjacent a wheel, a locking element carried by the pivot for said clamping device, and means to engage said locking element when the clamping device is moved to non-use position to maintain the clamping device in said non-use position.

2. In a lock for vehicle wheels, a clamping device pivotally connected to said vehicle adjacent a wheel, a locking element associated with the clamping device and movable therewith, and a yieldable device to engage the locking element when said clamping device is moved to non-use position to maintain said clamping device in the non-use position.

3. In a lock for vehicle wheels, a clamping device, a pivot therefor, a bearing member for the pivot having an elongated slot concentric with the axis thereof, a pin carried by the pivot passing through said slot, and a yieldable latching device carried by the bearing arranged to engage said pin when the clamping device is moved to a position of non-use to hold the clamping device in non-use position.

Signed at New York city, N. Y., this 23 day of April, 1920.

HARRY KRAMER.

Witnesses:
MAURICE BLOCK,
EDWARD A. JARVIS.